United States Patent
Jeong

(10) Patent No.: US 8,857,910 B2
(45) Date of Patent: Oct. 14, 2014

(54) APPARATUS FOR MOVING HEADREST

(71) Applicant: Woobo Tech Co., Ltd., Pyeongtaek-si (KR)

(72) Inventor: Hae Il Jeong, Inchon (KR)

(73) Assignee: Woobo Tech Co., Ltd., Pyeongtaek-si, Gyeonggi-do (KR)

( * ) Notice: Subject to any disclaimer, the term of this patent is extended or adjusted under 35 U.S.C. 154(b) by 67 days.

(21) Appl. No.: 13/681,787

(22) Filed: Nov. 20, 2012

(65) Prior Publication Data
US 2013/0320737 A1  Dec. 5, 2013

(30) Foreign Application Priority Data
Nov. 23, 2011  (KR) .................. 10-2011-0122805

(51) Int. Cl.
| A47C 1/10 | (2006.01) |
| A47C 7/36 | (2006.01) |
| A61G 15/00 | (2006.01) |
| B60R 22/28 | (2006.01) |
| B60N 2/48 | (2006.01) |

(52) U.S. Cl.
CPC ............ *B60N 2/4805* (2013.01); *B60N 2/4855* (2013.01); *B60N 2/4841* (2013.01)
USPC ....... 297/408; 297/403; 297/216.12; 297/391

(58) Field of Classification Search
USPC .................... 297/391, 216.12, 408, 409, 410
See application file for complete search history.

(56) References Cited

U.S. PATENT DOCUMENTS

| 2,828,810 A * | 4/1958 | Barecki et al. ............... 297/396 |
| 4,540,217 A * | 9/1985 | Suzuki ............................ 297/391 |
| 4,830,434 A * | 5/1989 | Ishida et al. ................... 297/408 |
| 7,341,312 B2 * | 3/2008 | Gauthier et al. .............. 297/408 |
| 7,578,559 B2 * | 8/2009 | Yamane et al. ................ 297/408 |

(Continued)

FOREIGN PATENT DOCUMENTS

| JP | 2000-21765 | 8/2000 | ............... A47C 7/38 |
| JP | 2000-217659 | 8/2000 | ............... A47C 7/38 |

(Continued)

OTHER PUBLICATIONS

Korean Patent Office, Notice of Allowance, Application No. 10-2012-0128303, dated Sep. 30, 2013, 3 pages.

(Continued)

*Primary Examiner* — Chi Q Nguyen
(74) *Attorney, Agent, or Firm* — Sunstein Kann Murphy & Timbers LLP

(57) ABSTRACT

Disclosed herein is an apparatus for moving a headrest. The apparatus includes a stay rod, a fixing cam which is fixed to the stay rod and provided with a locking protrusion, a rotating cam which is provided on the fixing cam and has an insert depression into which the locking protrusion is inserted, a support spring which biases the rotating cam to the fixing cam, and a return spring which has a first end fixed in place and a second end connected to the rotating cam. The fixing cam has a spring support supporting the support spring. The rotating cam has a through hole which has a diameter greater than a diameter of the stay rod so that the rotating cam can be provided around the stay rod after passing through one end of the stay rod and a bent portion of the stay rod.

6 Claims, 12 Drawing Sheets

(56) References Cited

U.S. PATENT DOCUMENTS

| | | | |
|---|---|---|---|
| 7,717,516 B2 | 5/2010 | Sutter, Jr. et al. | 297/403 |
| 7,988,234 B2 * | 8/2011 | Kim et al. | 297/408 |
| 8,002,356 B2 | 8/2011 | Lutzka et al. | 297/408 |
| 8,348,347 B2 * | 1/2013 | Willard et al. | 297/408 |
| 8,449,036 B2 * | 5/2013 | Jeong | 297/408 |
| 2005/0088027 A1 * | 4/2005 | Yetukuri et al. | 297/408 |
| 2008/0073951 A1 * | 3/2008 | Hattori et al. | 297/216.12 |
| 2009/0021068 A1 * | 1/2009 | Yamane et al. | 297/408 |
| 2009/0152924 A1 | 6/2009 | Kim et al. | 297/408 |

FOREIGN PATENT DOCUMENTS

| | | | |
|---|---|---|---|
| JP | 2001-517968 | 10/2001 | B60N 2/48 |
| JP | 2012-162123 | 8/2012 | B60N 2/48 |
| KR | 1998-052532 | 8/2000 | B60N 2/48 |
| KR | 2009-0091904 | 8/2009 | B60N 2/48 |
| KR | 2010-0048410 | 5/2010 | B60N 2/48 |
| WO | WO 97/38874 | 10/1997 | B60N 2/48 |

OTHER PUBLICATIONS

International Searching Authority, International Search Report—International Application No. PCT/KR2012/009937, dated Mar. 28, 2013, together with the Written Opinion of the International Searching Authority, 6 pages.

* cited by examiner

Prior Art

APPARATUS FOR MOVING HEADREST

CROSS REFERENCE TO RELATED APPLICATION

This application claims the benefit of priority to Korean patent application serial number KR10-2011-0122805 filed Nov. 23, 2011, the entire content of which is incorporated by reference herein.

BACKGROUND OF THE INVENTION

1. Field of the Invention

The present invention relates, in general, to apparatuses for moving headrests and, more particularly, to an apparatus for moving a headrest which is assembled in such a way that a rotating cam is provided on a stay rod after passing through one end of the stay rod and a bending part thereof.

2. Description of the Related Art

A conventional headrest includes a stay rod 100, a braking cam 200, a movable cam 300, a return spring 400, a support spring 500, a rotating member 600 and a release rod 700. The stay rod 100 includes a horizontal part 101 and vertical parts 102 which extend downwards from opposite ends of the horizontal part 101. The braking cam 200 has a shaft hole 20a in a central portion thereof so that the braking cam 200 is fitted over the horizontal part 101 through the shaft hole 20a. At least one braking depression 201 and at least one braking protrusion 202 are provided on one axial side surface of the braking cam 200. The movable cam 300 has a shaft hole 30a in a central portion thereof. Thus, the movable cam 300 is fitted over the horizontal part through the shaft hole 30a such that the movable cam 300 is brought into contact with the braking cam 200. At least one locking protrusion 301 and at least one locking depression 302 which engage with the braking depression 201 and the braking protrusion 202 are formed in a corresponding axial side surface of the movable cam 300. A coupling piece 303 which has a coupling hole 304 extends outward from an upper portion of a circumferential outer surface of the movable cam 300. The return spring 400 is provided on the horizontal part 101 and disposed outside the braking cam 200. An inner end 401 of the return spring 400 is locked to the braking cam 200. The support spring 500 is provided on the horizontal part 101 and disposed outside the movable cam 300. The elastic force of the support spring 500 biases the movable cam 300 to the braking cam 200. The rotating member 600 includes a pair of side plates 602 and 602' which are provided on the horizontal part 101 and are respectively disposed on outer ends of the return spring 400 and support spring 500. A shaft hole 60a is formed in each side plate 602, 602'. A front surface plate 601 laterally extends inward from a front end of each side plate 602, 602'. The front surface plates 601 of the side plates 602 and 602' are overlapped with each other and adhered to each other. A hook hole 603 is formed in an upper portion of the first side plate 602, and an outer end of the return spring 400 is hooked to the hook hole 603. Thus, the rotating member 600 is biased rearward by the elastic force of the return spring 400 so that the rotating member 600 can be rotated rearward and oriented horizontally. The release rod 700 has an inner end part 70a which is formed between a stepped portion 701 and an inner end of the release rod 700. The diameter of the inner end part 70a is less than that of the other portion of the release rod 700. The inner end part 70a is inserted into the coupling hole 304 of the coupling piece 303 and a support hole 605 of the second side plate 602' which have the same diameter as that of the inner end part 70a. A button 702 is coupled to an outer end of the release rod 700 which passes through the through hole 604 of the first side plate 602, an inner cover and a side surface of a support member. The outer end of the release rod 700 is exposed to the outside of a vehicle seat.

In the conventional vehicle headrest having the above-mentioned construction, when the support member is rotated upright, the rotating member 600 is also rotated upright. At this time, the movable cam 300 which is coupled to the rotating member 600 by the inner end part 70a of the release rod 700 is also rotated upright.

Then, the locking protrusion 301 and the locking depression 302 of the movable cam 300 respectively face the braking depression 201 and the braking protrusion 202 of the braking cam 200. Simultaneously, the movable cam 300 is pushed onto the braking cam 200 by the elastic force of the support spring 500 so that the locking protrusion 301 and the braking protrusion 202 respectively engage with the braking depression 201 and the locking depression 302. Thereby, the movable cam 300 and the rotating member 600 are restricted from rotating. As a result, the support member is maintained in the upright state without rotating rearward, even though the elastic force of the return spring 400 is applied thereto.

Furthermore, when the rotating member 600 is in the upright state, a lower end of the front surface plate 601 is supported on a rear support piece 204 of the braking cam 200. Thus, even if comparatively strong impact is applied thereto in the forward direction, the rotating member 600 is maintained in the upright state without rotating forward.

Meanwhile, to rotate the support member downward, the button 702 is pushed so that the release rod 700 is moved inward. Then, the movable cam 300 is moved along with the release rod 700 and separated from the braking cam 200. Thereby, the locking protrusion 301 and the locking depression 302 of the movable cam 300 are removed from the braking depression 201 and the braking protrusion 202 of the braking cam 200. The rotating member 600 is thus released from the brake state and immediately rotated rearward by the elastic force of the return spring 400. Eventually, the support member is rotated downward so that it can be prevented from blocking the view.

As such, when the support member has rotated downward, the locking protrusion 301 of the movable cam 300 that has rotated rearward along with the rotating member 600 is misaligned from the braking depression 201 of the braking cam 200 while the braking protrusion 202 is misaligned from the locking depression 302. In addition, the locking protrusion 301 and the braking protrusion 202 become supported on planar portions of corresponding support parts. Therefore, even though the movable cam 300 is pushed toward the braking cam by the elastic force of the support spring 500, the locking protrusion 301 and the braking protrusion 202 do not engage with the braking depression 201 and the locking depression 302.

In this state, if the support member is rotated forward such that it is oriented upright, the movable cam 300 is rotated forward, and the locking protrusion 301 and the braking protrusion 202 are moved from the planar portions of the support parts along curved portions of the support parts. When the locking protrusion 301 and the braking protrusion 202 respectively reach the braking depression 201 and the locking depression 302, the locking protrusion 301 and the braking protrusion 202 can no longer be supported by the support parts. Then, the movable cam 300 is immediately pushed onto the braking cam 200 by the elastic force of the support spring 500, so that the locking protrusion 301 and the braking protrusion 202 are respectively inserted into the braking depression 201 and the locking depression 302. Thereby, the movable cam 300 is rotated neither forward nor rearward and is maintained in the upright state.

Here, each planar portion of the support parts is lower than the braking protrusion 202 or the locking protrusion 301. Each curved portion is higher than the planar portion but is lower than the braking protrusion 202 or the locking protrusion 301. Therefore, in the process of rotating the movable cam 300 forward and orienting it upright, when the locking protrusion 301 and the braking protrusion 202 which have been disposed on the planar portions of the support parts reach the braking depression 201 and the locking depression 302 after passing over the curved portions, because the curved portions are lower than the locking protrusion 301 and the braking protrusion 202 which are adjacent to the corresponding braking depression 201 and locking depression 302, this height difference makes the end of the locking protrusion 301 be supported by the end of the braking protrusion 201. Thereby, the movable cam 300 is stopped and can no longer be rotated. Simultaneously, the movable cam 300 is pushed onto the braking cam 200 by the elastic force of the support spring 500 so that the locking protrusion 301 and the braking protrusion 202 can reliably engage with the braking depression 201 and the locking depression 302.

When the movable cam 300 is rotated downward, the locking protrusion 301 and the braking protrusion 202 are supported on the planar portions of the corresponding support parts. At this time, because of a difference in height between the planar portions and the locking protrusion 301 and braking protrusion 202, a stop portion is formed on each side surface of the locking protrusion 301 and braking protrusion 202 which come into contact with the corresponding planar portions. Then, the stop portions of the locking protrusion 301 and braking protrusion 202 that are placed on the planar portions are respectively blocked by the corresponding stop portions of the braking protrusion 202 and locking protrusion 301. Thereby, the movable cam 300 no long rotates downward.

In the drawing, the reference numeral 800 denotes a coupling cap, and 801 denotes a coupling part.

However, in the conventional headrest, to couple the two opposite parts of the rotating member 600 to the stay rod 100, work such as welding is required. In addition, the two opposite parts of the rotating member 600 must also be coupled to each other by welding or the like after the movable cam 300 and the braking cam 200 have been disposed between the two opposite parts. Therefore, the assembly process is complicated, and the production cost is also increased.

SUMMARY OF THE INVENTION

Accordingly, the present invention has been made keeping in mind the above problems occurring in the prior art, and an object of the present invention is to provide an apparatus for moving a headrest which has a simple structure so that the assembly process is simplified, thus reducing the production cost.

In order to accomplish the above object, in an aspect, the present invention provides an apparatus for moving a headrest, including: a stay rod; a fixing cam fixed to the stay rod, with a locking protrusion provided on the fixing cam; a rotating cam rotatably provided on the fixing cam, the rotating cam having an insert depression into which the locking protrusion is inserted; a support spring applying elastic force to the rotating cam so that the rotating cam is biased to the fixing cam; and a return spring having a first end fixed in place, and a second end connected to the rotating cam, wherein the fixing cam comprises a spring support supporting one end of the support spring, and the rotating cam has a through hole therein, the through hole having a diameter greater than a diameter of the stay rod so that the rotating cam can be provided around the stay rod after passing through one end of the stay rod and a bent portion of the stay rod.

The apparatus may further include a push member pushing the rotating cam, wherein the rotating cam includes a push member coupling part coupled to the push member.

The apparatus may further include a wire member pulling the rotating cam, wherein the rotating cam has a locking depression to which the wire member is locked.

The spring support may comprise a snap ring, and an insert groove may be formed in the fixing cam so that the spring support is fitted into the insert groove.

In another aspect, the present invention provides an apparatus for moving a headrest, including: a stay rod; a fixing cam fixed to the stay rod, with a locking protrusion provided on the fixing cam; a rotating cam rotatably provided on the fixing cam, the rotating cam having an insert depression into which the locking protrusion is inserted; a support spring applying elastic force to the rotating cam so that the rotating cam is biased to the fixing cam; and a return spring having a first end fixed in place, and a second end connected to the rotating cam, wherein the rotating cam has a through hole therein, the through hole having a diameter greater than a diameter of the stay rod so that the rotating cam can be provided around the stay rod after passing through one end of the stay rod and a bent portion of the stay rod.

The apparatus may further include a cover enclosing the fixing cam, the rotating cam, the support spring and the return spring, wherein a spring support is formed on the cover, the spring support supporting one end of the support spring.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
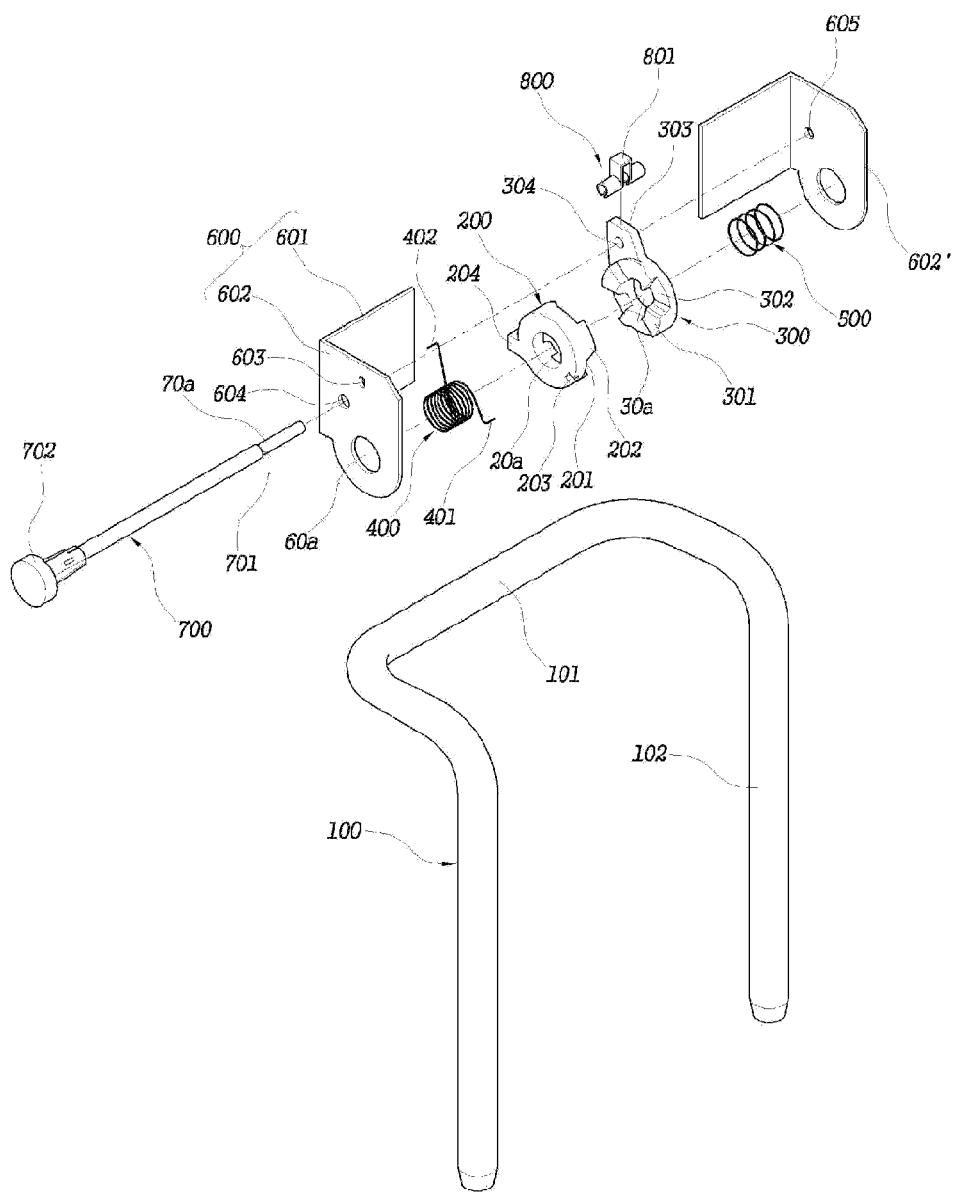
FIG. 1 is an exploded perspective view of a conventional apparatus for folding a headrest.

Hereinafter, preferred embodiments of the present invention will be described in detail with reference to the attached drawings.

For reference, among components or structures of the present invention to be described herein below, the explanation of the same components or structures as those of the above-described conventional art refers to an explanation of the conventional art, and further detailed explanation thereof will be omitted.

As shown in FIGS. 2 through 8, an apparatus for moving a headrest according to a first embodiment of the present invention includes a stay rod 20, a fixing cam 30, a rotating cam 40, a support spring 50 and a return spring 60. The fixing cam 30 is fixed to the stay rod 20 and provided with locking protrusions 33. The rotating cam 40 is rotatably provided on the fixing cam 30 and has insert depressions 41 into which the locking protrusions 33 are removably inserted. The support spring 50 applies elastic force to the rotating cam 40 so that the rotating cam 40 is biased to the fixing cam 30. The return spring 60 has a first end 61 which is fixed in place, and a second end 62 which is connected to the rotating cam 40. The fixing cam 30 has a spring support which supports a first end of the support spring 50. A through hole 42 is formed in the rotating cam 40. The diameter of the through hole 42 is greater than that of the stay rod 20 so that the rotating cam 40 can be provided around a medial portion of the stay rod 20 after passing through one end of the stay rod 20 and a bent portion thereof.

Figure 2:
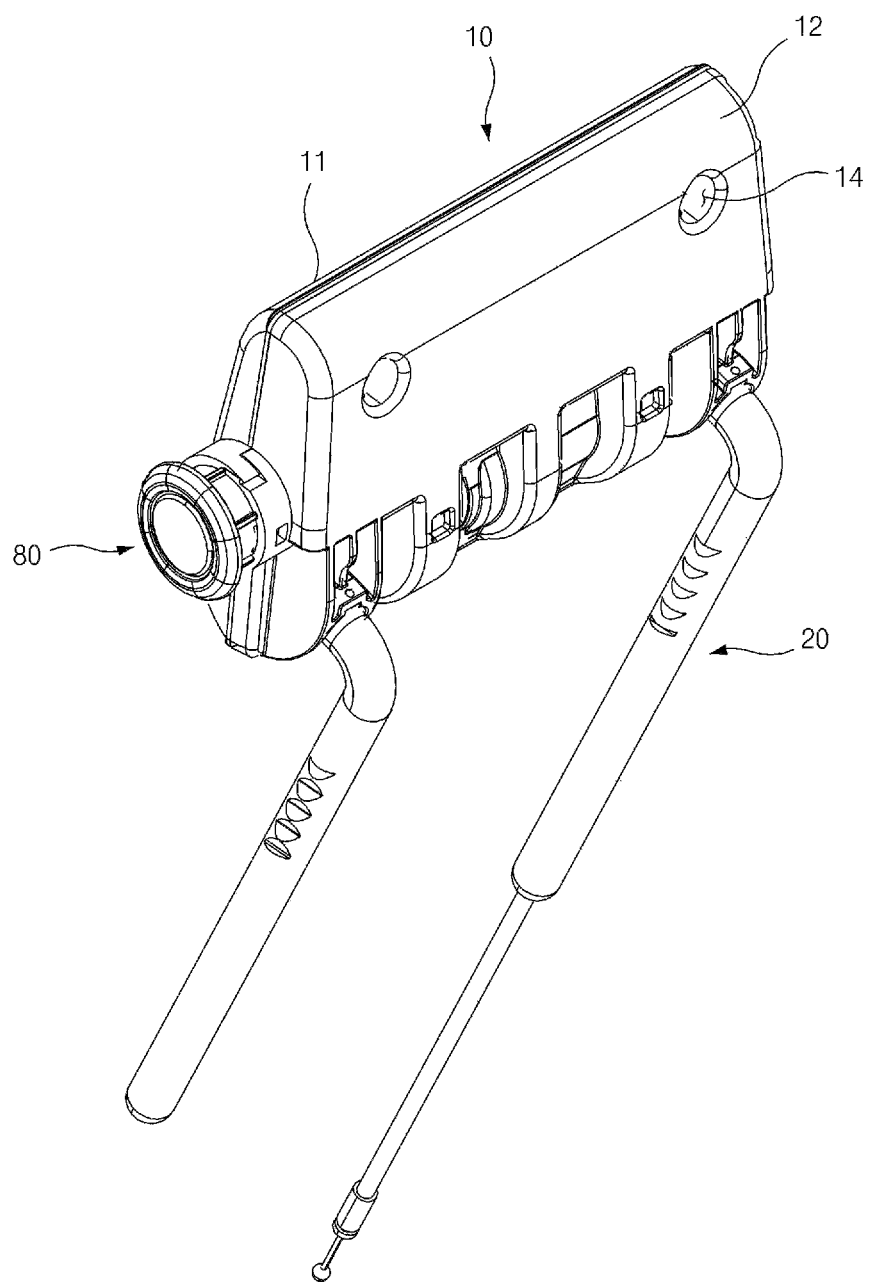
FIG. 2 is a perspective view illustrating an apparatus for moving a headrest, according to a first embodiment of the present invention.

As shown in FIG. 2, the headrest moving apparatus of the present invention further includes a cover 10 which encloses the front and rear of the apparatus.

The cover 10 includes a front cover 11 which is disposed in the front of the apparatus, and a rear cover 12 which is disposed in the rear of the apparatus and coupled to the front cover 11.

Figure 3:
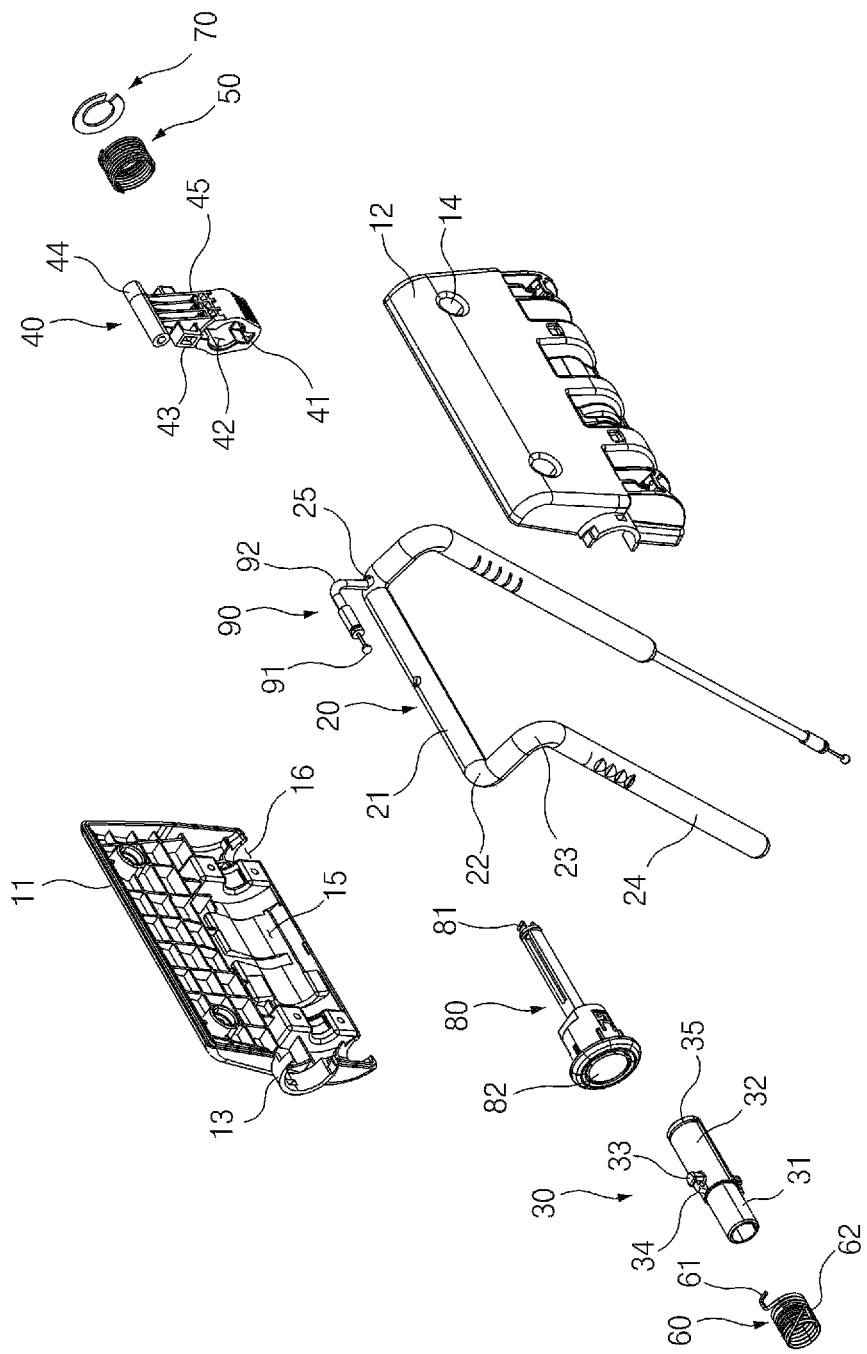
FIG. 3 is an exploded perspective view of FIG. 2.

As shown in FIG. 3, coupling holes 14 are formed in respective opposite sides of each of the front and rear covers 11 and 12 so that the front and rear covers 11 and 12 can be coupled to each other.

A push member guide 13 protrudes from one end of the cover 10. A portion of the push member guide 13 is formed on the front cover 11 and the other portion thereof is formed on the rear cover 12.

Coupling hooks are formed on opposite ends of the portion of the push member guide 13 that is provided on the front cover 11. Coupling hook depressions, to which the coupling hooks are locked, are formed on opposite ends of the portion of the push member guide 13 that is provided on the rear cover 12.

Furthermore, a coupling depression is formed in a perimeter of a rear end of the front cover 11. A coupling protrusion is formed on a perimeter of a front end of the rear cover 12 so that the coupling protrusion is inserted into the coupling depression.

The coupling depression, the coupling protrusion, the coupling hooks and the coupling hook depressions make it possible to temporarily assemble the front cover 11 with the rear cover 12, thus facilitating the assembly process.

In addition, stay rod lead holes 16 are formed in opposite sides of a lower portion of the cover 10.

Each stay rod lead hole 16 extends, forward and rearward, a predetermined length greater than the diameter of the stay rod 20 so that the cover 10 can be folded forward and rearward with respect to the stay rod 20. The stay rod lead holes 16 determine an angle at which the headrest can be folded.

A seating portion 15 is formed in each of the first and rear covers 11 and 12 between the stay rod lead holes 16 which are formed in the opposite sides of the cover 10.

Vertical and horizontal reinforcing ribs are formed in the cover 10, thus enhancing the durability of the cover 10.

Figure 6:
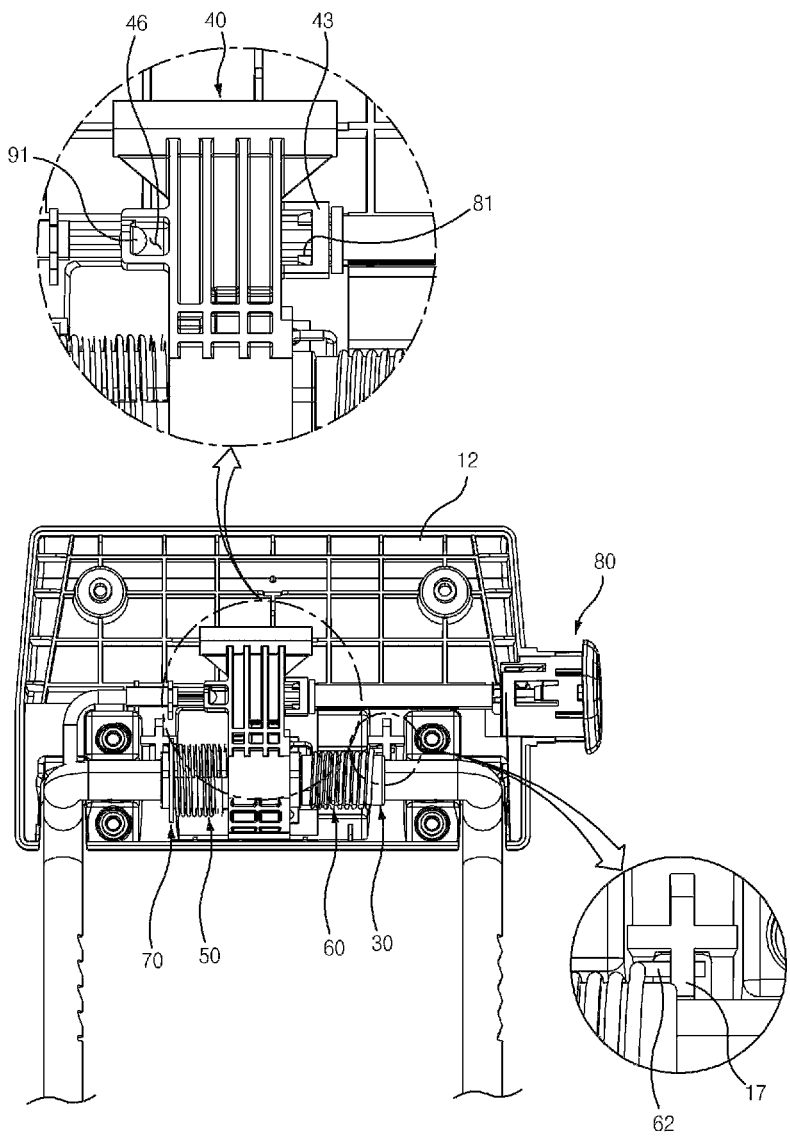
FIG. 6 is a front view of the headrest moving apparatus of FIG. 2 from which a front cover has been removed.

As shown in FIG. 6, a spring locking protrusion 17 is provided on the inner surface of the rear cover 12.

As shown in FIG. 3, a horizontal part 21 is provided in a medial portion of the stay rod 20. Bending parts are formed on opposite ends of the horizontal part 21. A vertical part 24 extends from each bending part.

The bending part includes a first bending part 22 which is bent rearward, and a second bending part 23 which is bent downward.

A wire lead hole 25 is formed in the first bending part 22 of the stay rod 20.

The fixing cam 30 is fixed to the horizontal part 21 of the stay rod 20. The locking protrusions 33 are provided on the fixing cam 30.

The fixing cam 30 generally has a cylindrical shape.

The cylindrical fixing cam 30 includes a small-diameter part 31 and a large-diameter part 32 which has an outer diameter larger than that of the small-diameter part 31.

The locking protrusions 33 are respectively provided on upper and lower portions of a circumferential outer surface of a first end of the large-diameter part 32.

Each locking protrusion 33 has a cylindrical shape.

Further, a spring installation part 34 is disposed on a side portion of each locking protrusion 33 and provided on the circumferential outer surface of the large-diameter part 32. Preferably, the spring installation part 34 is integrally formed on the side portion of the locking protrusion 33 so that the strength of the locking protrusion 33 can be enhanced.

The spring installation part 34 has a hole into which an end of the return spring 60 can be inserted.

An insert groove 35 is formed around a circumferential outer surface of a second end of the large-diameter part 32.

The rotating cam 40 has, in a lower portion thereof, the through hole 42 into which the large-diameter part 32 of the fixing cam 30 is inserted in the lateral direction, so that the rotating cam 40 is rotatably provided around the fixing cam 30.

Further, the rotating cam 40 has insert depressions 41 into which the locking protrusions 33 are respectively inserted.

The lower portion of the rotating cam 40 has a cylindrical shape. A protruding part 45 is provided on an upper end of the cylindrical lower portion of the rotating cam 40.

The protruding part 45 is tapered such that the thickness thereof is reduced from the bottom to the top.

Reinforcing ribs are formed on an outer surface of the protruding part 45.

A cylindrical part 44 is provided on an upper end of the protruding part 45. The cylindrical part 44 laterally extends a length greater than the width of the lower portion of the rotating cam 40.

The above-mentioned structure of the rotating cam 40 can make the apparatus compact. In addition, when the headrest is put into an upright position, the headrest can be reliably supported in the upright state.

The insert depressions 41 communicate with the through hole 42 and are disposed above and below the through hole 42.

The through hole 42 is formed such that the diameter thereof is greater than that of the stay rod 20, whereby the rotating cam 40 can be provided around the medial portion of the stay rod 20 after passing through one end of the stay rod 20 and the corresponding bent portion thereof.

In detail, the inner diameter of the through hole 42 of the rotating cam 40 and/or the width of the rotating cam 40 is determined in consideration of both the radius of curvature of the bending part of the stay rod 20 and the outer diameter of the fixing cam 30 so that the rotating cam 40 can pass through the bending part before being disposed on the medial portion of the stay rod 20.

Furthermore, the rotating cam 40 is formed into an integrated body.

A push member coupling part 43 protrudes from a first side portion of the protruding part 45. An installation depression is formed in the push member coupling part 43.

As shown in FIG. 6, a locking depression 46 is formed in a second side portion of the protruding part 45 so that a wire member 90 is locked to the locking depression 46.

The rotating cam 40 having the above-mentioned structure is connected to the cover 10 in such a way that the rotating cam 40 is seated in the seating portion 15 of the cover 10. Hence, if the cover 10 is folded, the rotating cam 40 is also folded, and if the rotating cam 40 is fixed, the cover 10 is also fixed.

The support spring 50 applies elastic force to the rotating cam 40 so that the rotating cam 40 is biased towards the fixing cam 30.

The support spring 50 is provided around the large-diameter part 32 of the fixing cam 30 and is disposed between the locking protrusion 33 and the insert groove 35 of the fixing cam 30.

The fixing cam 30 around which the support spring 50 is provided is made of material such as plastic, so noise is prevented from being generated while it is operating.

A first end 61 of the return spring 60 is fixed, while a second end 62 thereof is connected to the rotating cam 40.

The return spring 60 is provided around the small-diameter part 31.

The first end 61 of the return spring 60 is fitted into and fixed to the spring installation part 34 of the fixing cam 30.

The second end 62 of the return spring 60 is inserted into and locked to the spring locking protrusion 17 of the rear cover 12.

Further, the spring support which supports the first end of the support spring 50 is provided on the fixing cam 30.

The spring support comprises a snap ring 70. The snap ring 70 which is the spring support is fitted into the insert groove 35 of the fixing cam 30. As such, because the assembly of the spring support can be embodied merely by inserting the spring support into the insert groove 35, the installation of the spring support on the fixing cam 30 can be facilitated.

The headrest moving apparatus of the present invention further includes a push member 80 which pushes the rotating cam 40.

A push part 82 is provided on a first end of the push member 80, and locking hooks 81 are provided on a second end thereof.

The shape of the push part 81 is that of a comparatively large disk to enable a user to easily push the push part 81.

The locking hooks 81 are respectively provided on opposite sides of the second end of the push member 80 and spaced apart from each other. The locking hooks 81 are locked into the installation depression of the push member coupling part 43 of the rotating cam 40.

The headrest moving apparatus of the present invention further includes the wire member 90 which pulls the rotating cam 40.

The wire member 90 is covered with a tube 92 and protected by it. The wire member 90 may be connected to a vehicle seat (not shown) through the stay rod 20.

The wire member 90 which is laid in the stay rod 20 is led out of the stay rod 20 through the wire lead hole 25.

Locking protrusions 91 are provided on respective opposite ends of the wire member 90. The corresponding locking protrusion 91 is locked to the locking depression 46 of the rotating cam 40.

In this way, the wire member 90 is connected to the rotating cam 40, so that the assembly of the wire member 90 can be facilitated. Moreover, the wire member 90 makes it easy to fold the headrest.

Hereinafter, a process of assembling the first embodiment of the present invention having the above-mentioned construction will be explained.

Figure 4:
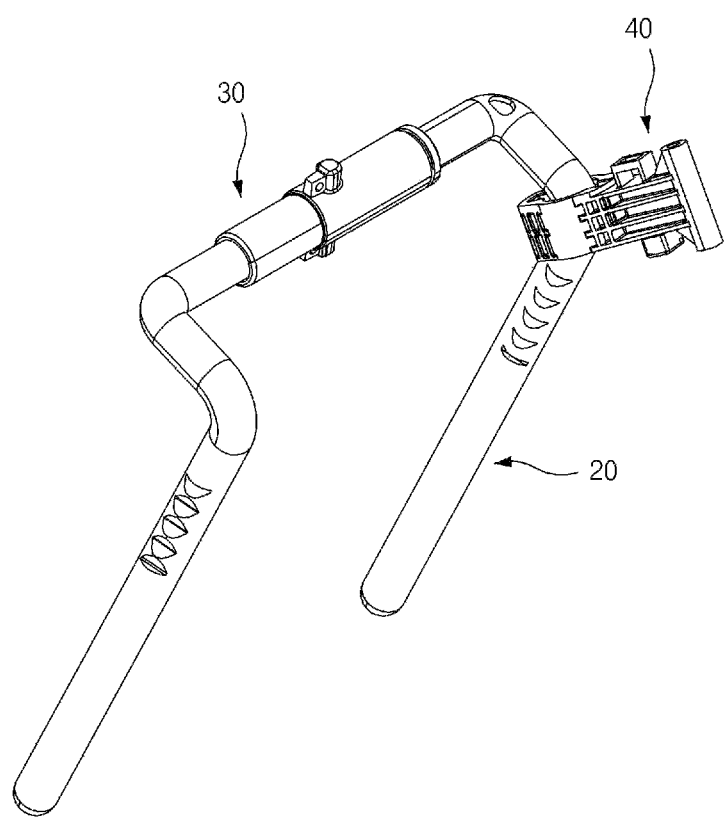
FIG. 4 is a perspective view illustrating a process of assembling the headrest moving apparatus according to the first embodiment of the present invention.
Figure 5:
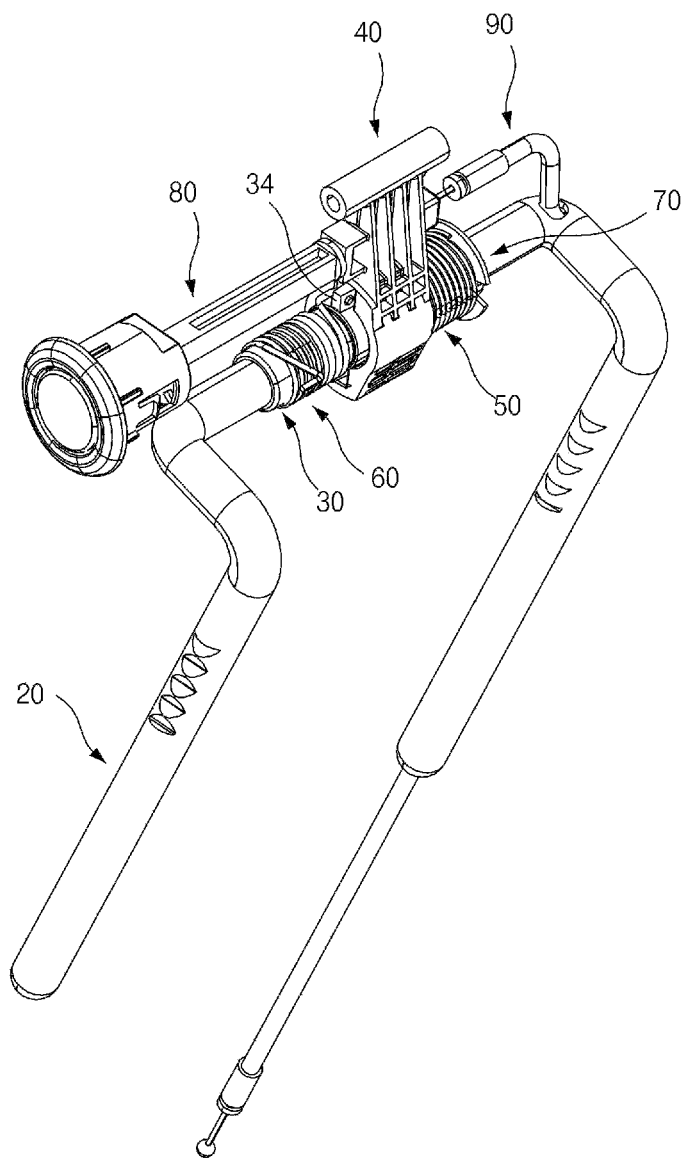
FIG. 5 is a perspective view of the headrest moving apparatus of FIG. 2 from which a cover has been removed.

As shown in FIG. 4, the fixing cam 30 is integrally formed on a medial portion of the horizontal part 21 of the stay rod 20 by insert molding or the like.

Subsequently, the rotating cam 40 is installed in such a way that the corresponding vertical part 24 of the stay rod 20 is inserted into the through hole 42 of the rotating cam 40 and then the rotating cam 40 is fitted over the large-diameter part 32 of the fixing cam 30 after passing through the second bending part 23 and the first bending part 22, as shown in FIG. 4.

The locking protrusions 33 of the fixing cam 30 are inserted into the corresponding insert depressions 41 of the rotating cam 40 so that the rotating cam 40 is fixed in place and prevented from rotating.

Thereafter, the support spring 50 is provided around the large-diameter part 32 of the fixing cam 30. The snap ring 70 is fitted into the insert groove 35 so that the support spring 50 can be prevented from being removed from its place.

Furthermore, the return spring 60 is provided around the small-diameter part 31 of the fixing cam 30. The first end of the return spring 60 is fitted into and fixed to the spring installation part 34.

Subsequently, the push member 80 is pressed towards the push member coupling part 43. Then, as shown in FIG. 6, the locking hooks 81 of the push member 80 are elastically bent while entering the push member coupling part 43 and then are returned to their original state when they completely enter the push member coupling part 43. As a result, the locking hooks 81 are locked to the push member coupling part 43 and prevented from being removed therefrom. As such, the push member 80 can be assembled in a one-touch manner.

The corresponding locking protrusion 91 of the wire member 90 is thereafter locked to the locking depression 46 of the rotating cam 40.

Subsequently, the rotating cam 40 is seated into the seating portion 15 of the rear cover 12, and the second end of the return spring 60 is inserted into the spring locking protrusion 17 of the rear cover 12. Thereby, the rotating cam 40 is eventually connected to the second end of the return spring 60.

The front cover 11 is coupled to the rear cover 12, thus completing the assembly process.

As stated above, the structure of the headrest moving apparatus of the present invention is simple, thus simplifying the process of assembling the headrest moving apparatus, thereby reducing the production cost.

The operation of the first embodiment of the present invention will be described below.

In the case where the headrest is in the upright state, the locking protrusions 33 of the fixing cam 30 are disposed in the corresponding insert depressions 41 of the rotating cam 40 such that the rotating cam 40 and the cover 10 are fixed in place. In this state, the rotating cam 40 is supported by the support spring 50 and thus prevented from being removed from the locking protrusion 33. In the structure in which the rotating cam 40 supports the headrest in the above-mentioned manner, because the rotating cam 40 is disposed in the center of the headrest and the central portion of the rotating cam 40 supports the headrest, the headrest can be stably supported.

Figure 7:
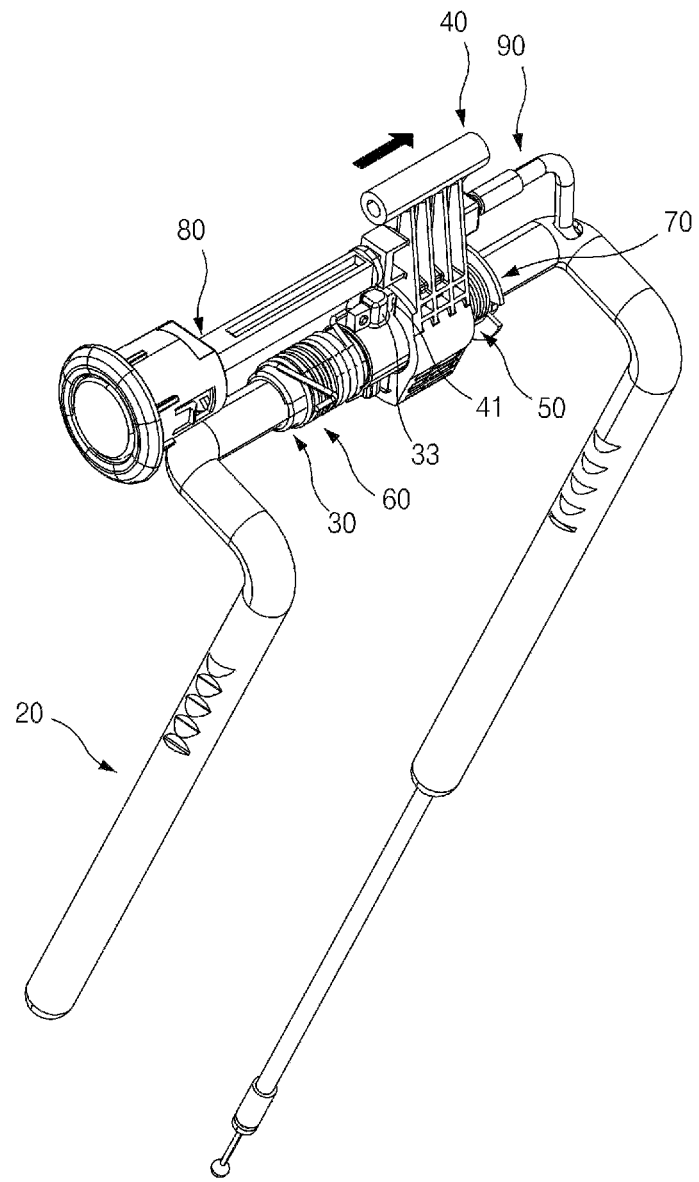
FIG. 7 is a perspective view illustrating a rotating cam which has been released from a fixing cam by a push member or a wire member.
Figure 8:
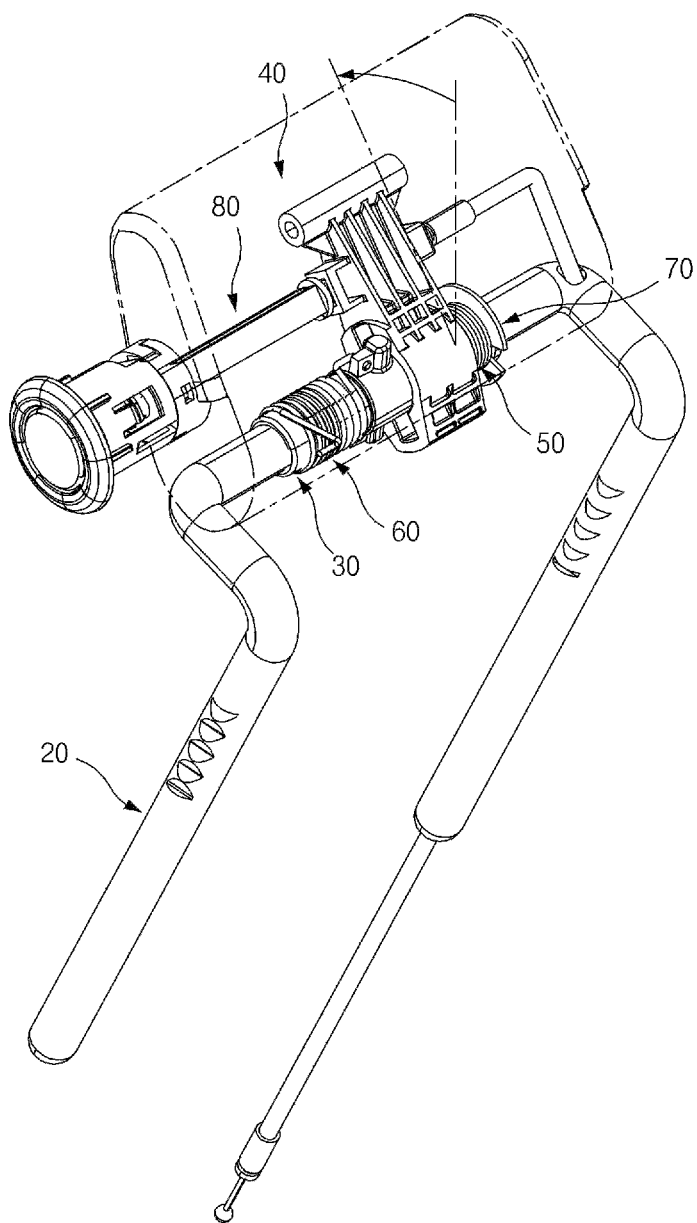
FIG. 8 is a perspective view illustrating a folded state of the headrest according to the first embodiment of the present invention.
Figure 9:
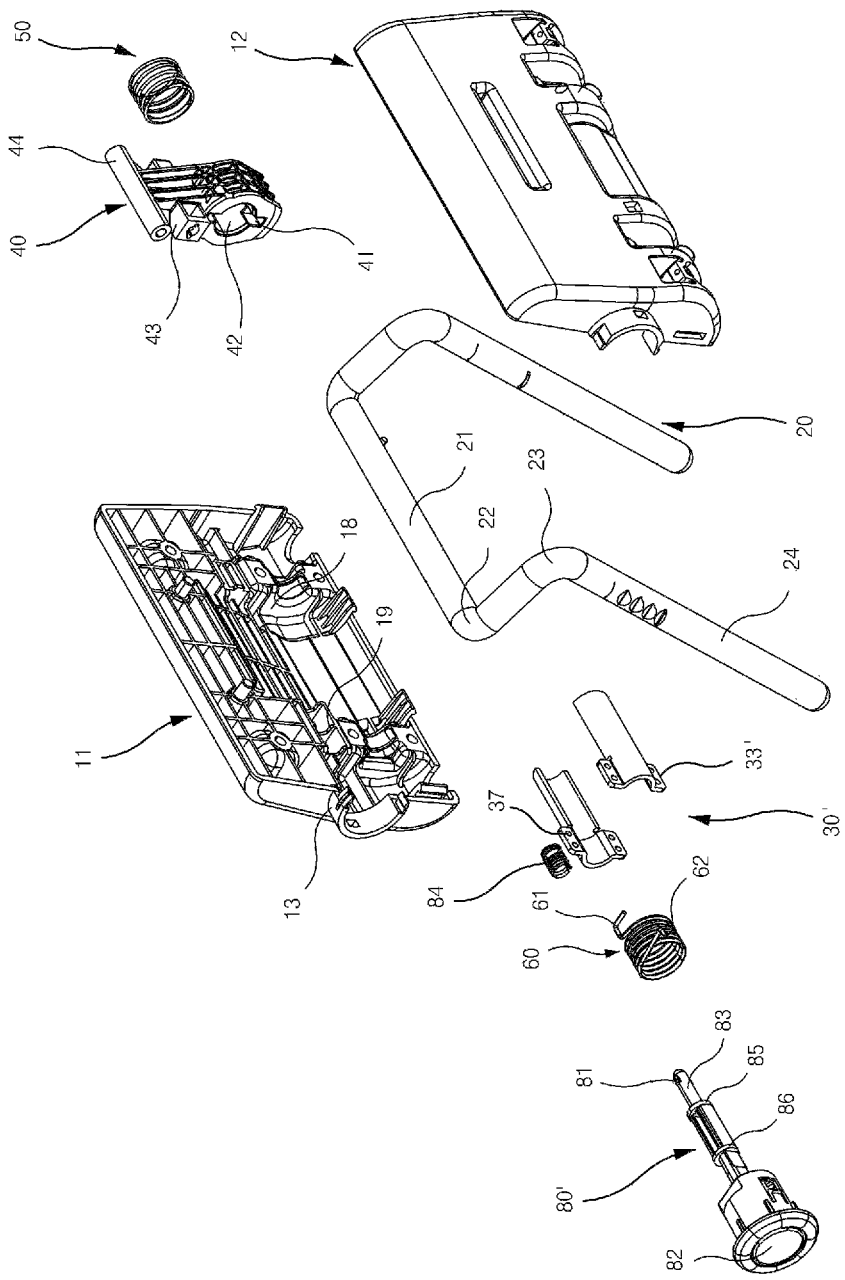
FIG. 9 is an exploded perspective view illustrating an apparatus for moving a headrest, according to a second embodiment of the present invention.
Figure 10:
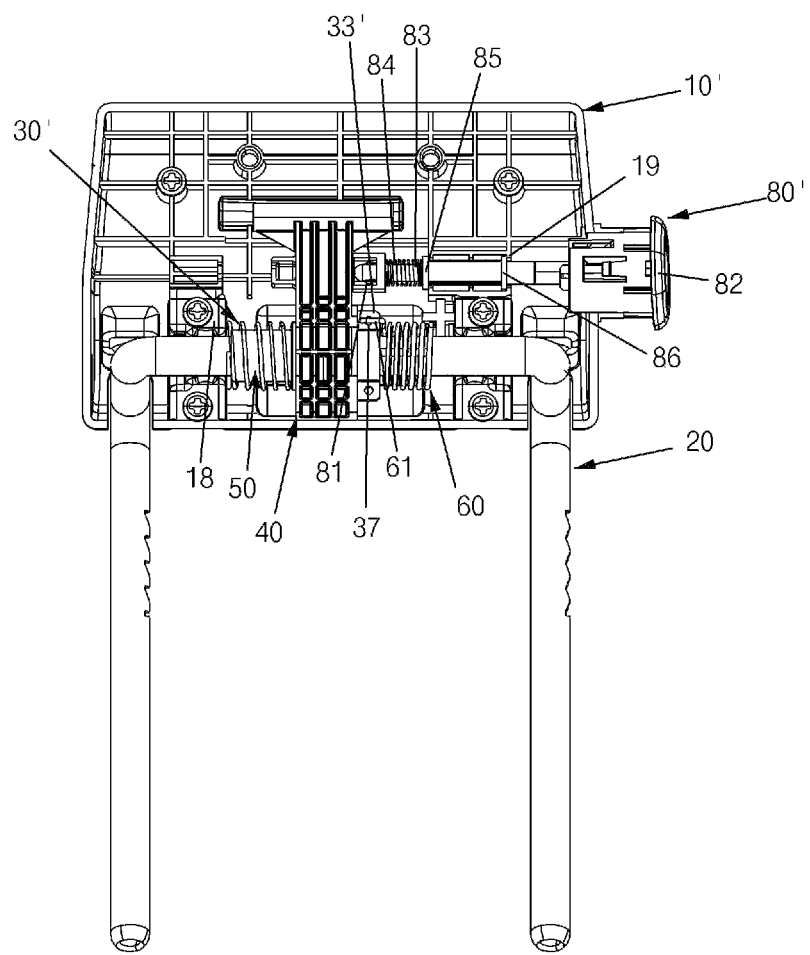
FIG. 10 is a front view of the headrest moving apparatus of FIG. 9 from which a front cover has been removed.
Figure 11:
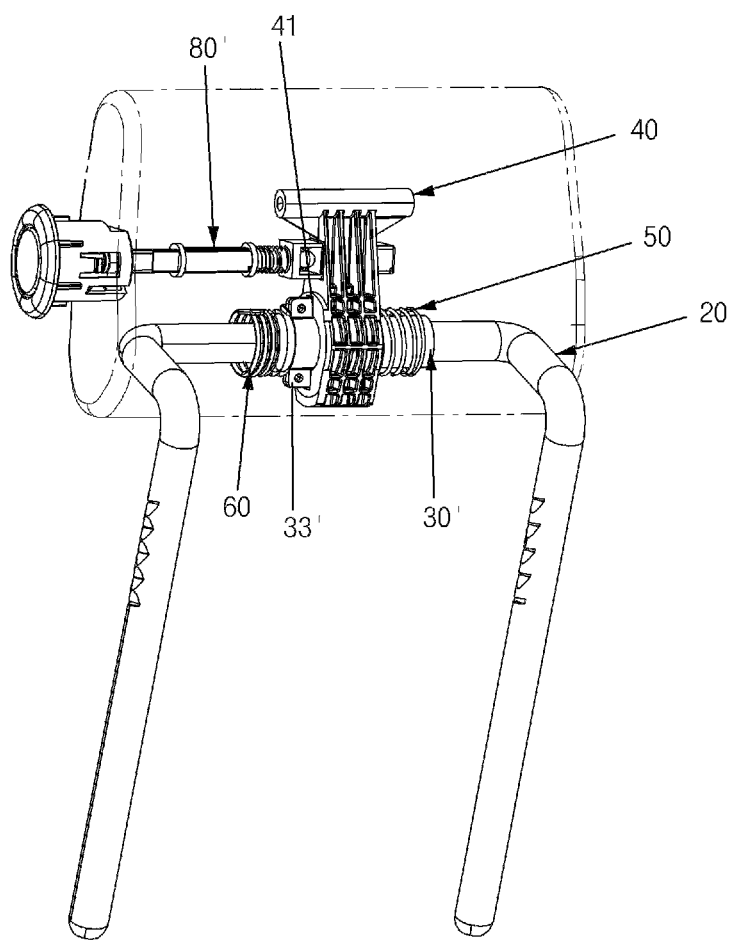
FIG. 11 is a perspective view illustrating an upright state of the headrest using the headrest moving apparatus of FIG. 9.
Figure 12:
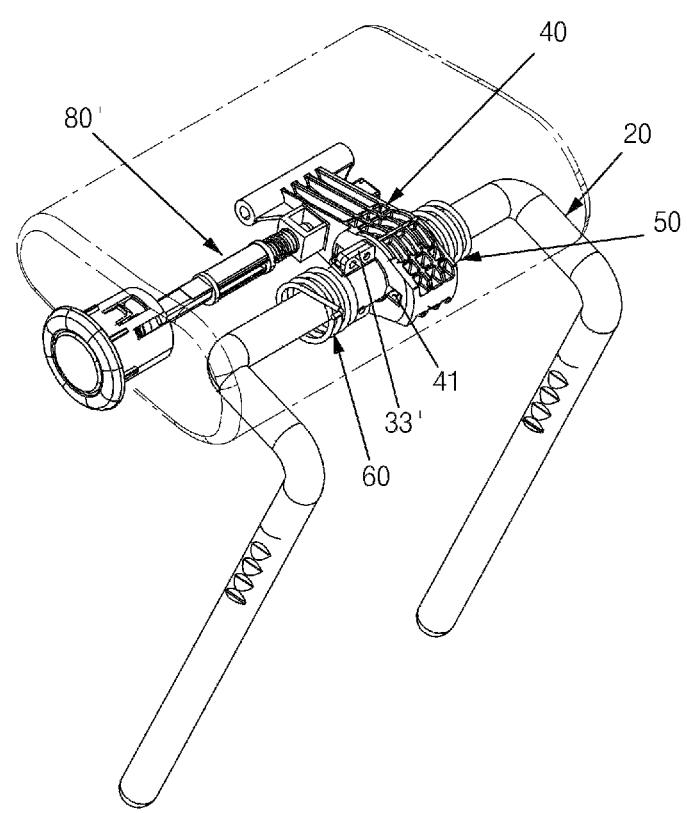
FIG. 12 is a perspective view illustrating a folded state of the headrest using the headrest moving apparatus of FIG. 9.

As shown in FIG. 7, to fold the headrest, the user pushes the push part 82 of the push member 80 or pulls the wire member 90 with force greater than the elastic force of the support spring 50. Then, the rotating cam 40 is moved, and the locking protrusions 33 are removed from the insert depression 41 so that the rotating cam 40 can rotate with respect to the fixing cam 30. As a result, the rotating cam 40 and the cover 10 are folded by the elastic force of the return spring 60, as shown in FIG. 8.

To return the headrest to the upright state again, the user has only to rotate the headrest such that the locking protrusions 33 are inserted into the corresponding insert depressions 41.

FIGS. 9 through 12 illustrate a headrest moving apparatus according to a second embodiment of the present invention.

As shown in FIGS. 9 through 12, the headrest moving apparatus includes a stay rod 20, a fixing cam 30', a rotating cam 40, a support spring 50 and a return spring 60. The fixing cam 30' is fixed to the stay rod 20 and provided with locking protrusions 33'. The rotating cam 40 is rotatably provided on the fixing cam 30' and has insert depressions 41 into which the locking protrusions 33' are removably inserted. The support spring 50 applies elastic force to the rotating cam 40 so that the rotating cam 40 is biased to the fixing cam 30'. The return spring 60 has a first end 61 which is fixed the hole 37 of the fixing cam 30', and a second end 62 which is locked to the spring locking protrusion 17 of the rear cover 12. The headrest moving apparatus further includes a cover 10' which encloses the fixing cam 30', the rotating cam 40, the support spring 50 and the return spring 60. A spring support 18 which supports a first end of the support spring 50 is provided in the cover 10'. A through hole 42 is formed in the rotating cam 40. The diameter of the through hole 42 is greater than that of the stay rod 20 so that the rotating cam 40 can be provided around a medial portion of the stay rod 20 after passing through one end of the stay rod 20 and a bent portion thereof.

The explanation of the same construction as that of the first embodiment will be omitted.

The headrest moving apparatus of the second embodiment further includes a cover 10' which covers the front and rear of the apparatus which includes the fixing cam 30', the rotating cam 40, the support spring 50 and the return spring 60.

The spring support 18 which supports the first end of the support spring 50 is provided in the cover 10'.

The spring support 18 comprises a protrusion which protrudes from the inner surface of the cover 10'.

Bolts are tightened into the spring support 18 to couple the front cover 11 and the rear cover 12 to each other.

The fixing cam 30' is configured such that it is divided into two parts. The fixing cam 30' is formed by assembling the two parts with each other.

Each of the two parts of the fixing cam 30' has a semi-circular cross-section.

The locking protrusions 33' are provided on corresponding ends of the two parts of the fixing cam 30'.

Two holes 37 are formed in each locking protrusion 33'. The first end 61 of the return spring 60 is inserted into one of the two holes 37. A fastening member such as a bolt is tightened into the other hole of the two holes 37 so that the two parts of the fixing cam 30' can be coupled to each other.

The headrest moving apparatus of the second embodiment further includes a push member 80'. A push part 82 is provided on a first end of the push member 80', and a reduced-diameter part 83 is formed on a second end of the push member 80'. A locking hook 81 is formed on the reduced-diameter part 83.

In the push member 80', a first flange 85 and a second flange 86 which is spaced apart from the first flange 85 are provided between the push part 82 and the locking hook 81.

A push member spring 84 which functions to return the push member 80' to its original position is provided around the reduced-diameter part 83.

A first end of the push member spring 84 is supported by a push member coupling part 43 of the rotating cam 40, and a second end thereof is supported by the first flange 85.

When force which has pushed the push member 80' is removed, the push member 80' is returned to its original position by the push member spring 84.

Furthermore, if the push member 80' is pushed to a predetermined position, the first flange 85 and the second flange 86 are blocked by flange stoppers 19 formed in the cover 10', thus preventing the push member 80' from being excessively pushed and damaged.

The headrest moving apparatus according to the present invention has the following effects.

The headrest moving apparatus includes a stay rod, a fixing cam which is fixed to the stay rod and provided with a locking protrusion, a rotating cam which is rotatably provided on the fixing cam and has an insert depression into which the locking protrusion is inserted, a support spring which applies elastic force to the rotating cam so that the rotating cam is biased to the fixing cam, and a return spring which has a first end fixed in place and a second end connected to the rotating cam. The fixing cam has a spring support supporting one end of the support spring. The rotating cam has a through hole therein. The through hole has a diameter greater than a diameter of the stay rod so that the rotating cam can be provided around the stay rod after passing through one end of the stay rod and a bent portion of the stay rod. As such, the structure of the headrest moving apparatus is simple, and the assembly process can be simplified. Thereby, the production cost can be reduced.

The apparatus further includes a push member which pushes the rotating cam. The rotating cam has a push member coupling part which is coupled to the push member. Thereby, the push member can be easily assembled with the rotating cam.

The apparatus further includes a wire member which pulls the rotating cam. The rotating cam has a locking depression to which the wire member is locked. As a result, the headrest can be easily folded by means of a wire.

The spring support comprises a snap ring, and an insert groove is formed in the fixing cam so that the spring support is fitted into the insert groove. Thus, the spring support can be easily installed on the fixing cam.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for moving a headrest, comprising:
a stay rod;
a fixing cam fixed to the stay rod, with a locking protrusion provided on the fixing cam;
a rotating cam rotatably provided on the fixing cam, the rotating cam having an insert depression into which the locking protrusion is inserted;
a support spring applying elastic force to the rotating cam so that the rotating cam is biased to the fixing cam; and
a return spring having a first end fixed in place, and a second end connected to the rotating cam,
wherein the fixing cam comprises a spring support supporting one end of the support spring, and the spring support comprises a snap ring, and an insert groove is formed in the fixing cam so that the spring support is fitted into the insert groove, and
wherein the rotating cam has a through hole therein, the through hole having a diameter greater than a diameter of the stay rod so that the rotating cam can be provided around the stay rod after passing through one end of the stay rod and a bent portion of the stay rod.

2. The apparatus according to claim 1, further comprising a push member pushing the rotating cam,
wherein the rotating cam comprises a push member coupling part coupled to the push member.

3. The apparatus according to claim 1, further comprising a wire member pulling the rotating cam,
wherein the rotating cam has a locking depression to which the wire member is locked.

4. An apparatus for moving a headrest, comprising:
a stay rod;
a fixing cam fixed to the stay rod, with a locking protrusion provided on the fixing cam;
a rotating cam rotatably provided on the fixing cam, the rotating cam having an insert depression into which the locking protrusion is inserted;
a support spring applying elastic force to the rotating cam so that the rotating cam is biased to the fixing cam; and
a return spring having a first end fixed in place, and a second end connected to the rotating cam,
wherein the rotating cam has a through hole therein, the through hole having a diameter greater than a diameter of the stay rod so that the rotating cam can be provided around the stay rod after passing through one end of the stay rod and a bent portion of the stay rod;
wherein the fixing cam comprises a spring support supporting one end of the support spring, and wherein the spring support comprises a snap ring, and an insert groove is formed in the fixing cam so that the spring support is fitted into the insert groove.

5. The apparatus according to claim 4, further comprising a cover enclosing the fixing cam, the rotating cam, the support spring and the return spring,
wherein the spring support is formed on the cover.

6. An apparatus for moving a headrest, comprising:
a stay rod;
a fixing cam fixed to the stay rod, with a locking protrusion provided on the fixing cam;
a rotating cam rotatably provided on the fixing cam, the rotating cam having an insert depression into which the locking protrusion is inserted;
a support spring applying elastic force to the rotating cam so that the rotating cam is biased to the fixing cam;
a return spring having a first end fixed in place, and a second end connected to the rotating cam; and
a wire member pulling the rotating cam, wherein the rotating cam has a locking depression to which the wire member is locked,
wherein the fixing cam comprises a spring support supporting one end of the support spring, and the rotating cam has a through hole therein, the through hole having a diameter greater than a diameter of the stay rod so that the rotating cam can be provided around the stay rod after passing through one end of the stay rod and a bent portion of the stay rod.

* * * * *